(12) United States Patent
Long, III

(10) Patent No.: US 6,360,693 B1
(45) Date of Patent: Mar. 26, 2002

(54) ANIMAL TOY

(76) Inventor: Ross Eugene Long, III, 4732 Reinhardt Dr., Oakland, CA (US) 94619

( * ) Notice: Subject to any disclaimer, the term of this patent is extended or adjusted under 35 U.S.C. 154(b) by 0 days.

(21) Appl. No.: 09/454,229

(22) Filed: Dec. 2, 1999

(51) Int. Cl.[7] ............................................. A01K 29/00
(52) U.S. Cl. ...................................................... 119/707
(58) Field of Search ................................ 119/702, 707, 119/709, 710, 711, 467, 468, 256, 268

(56) References Cited

U.S. PATENT DOCUMENTS

| | | | | |
|---|---|---|---|---|
| 1,006,182 A | * | 10/1911 | Cousin | 119/710 |
| 1,022,113 A | * | 4/1912 | Smith | 119/710 |
| 3,830,202 A | * | 8/1974 | Garrison | 119/710 |
| 4,202,922 A | * | 5/1980 | Osment | 428/18 |
| 5,018,480 A | * | 5/1991 | Goldman et al. | 119/26 |
| RE34,352 E | * | 8/1993 | Markham et al. | 119/710 |
| 5,752,463 A | * | 5/1998 | Jenkins | 119/57.8 |
| 5,819,687 A | * | 10/1998 | Lister | 119/52.1 |

* cited by examiner

Primary Examiner—Thomas Price

(57) ABSTRACT

An apparatus for use as a toy by an animal, for example a dog, to either fetch carry or chew includes a main section with at least one protrusion extending therefrom that resembles a branch in appearance. The toy is formed of any of a number of materials including rubber, plastic, or wood including wood composites and is solid. It is either rigid or flexible. A flavoring (scent) is added, if desired. The toy is adapted to float by including a material therein that is lighter than water or it is adapted to glow in the dark, as desired, by the addition of a fluorescent material that is either included in the material from which the toy is made or the flourescent material is applied thereto as a coating. The toy may be segmented (i.e., notched) so as to break off into smaller segments, as is useful for smaller animals or, alternatively, to extend the life of the toy. Various textured surfaces including camouflage colorings are anticipated as are straight or curved main sections. The toy may be formed of any desired material, as described, so as to be edible by the animal.

20 Claims, 3 Drawing Sheets

ANIMAL TOY

BACKGROUND OF THE INVENTION

1. Field of the Invention

The present invention, in general relates to animal toys and, more particularly, to devices that a dog can chew and carry in its mouth.

Dog chew toys are well known and include a wide variety of devices, some of which rapidly disintegrate—as is well known to most dog owners.

Other dog chew toys are sometimes used in fetching training exercises or simply for play but they may be difficult for the dog to pick up off of the ground. If tossed onto a body of water, they may sink. Furthermore, while a dog may see the toy at night or in dim light, the owner is unable to do so and therefore the toy cannot be used in dim light.

Other variations, such as it being edible or chewable (to relieve the natural tendency dogs have to chew) are also desirable features to incorporate in any dog chew toy design.

It is a natural tendency for dogs to chew and they often make inappropriate selections as to what they will chew. A scented or flavored animal toy that encourages a dog to chew, and possibly to consume it, would be useful.

When training dogs, especially hunting dogs, to fetch or when deciding which dog is especially good for the scent discrimination purpose, it is necessary to asses their ability to detect objects based solely on scent. Therefore an animal toy that is camouflaged would be useful in training and determining a dog's ability to locate hard to find objects based solely on scent.

Accordingly there exists today a need for an animal toy that floats, is easy to pick up off of the ground, can be seen in dim light, is made from a variety of possible materials, and which dogs may chew.

Clearly, such an apparatus would be a useful and desirable device.

2. Description of Prior Art

Dog toys are, in general, known. For example, the following patents describe various types of these devices:

U.S. Pat. No. 3,830,202 to Garrison, Aug. 20, 1974;
U.S. Pat. No. 4,133,296 to Smith, Jan. 9, 1979;
U.S. Pat. No. 4,557,219 to Edwards, Dec. 10, 1985;
U.S. Pat. No. 4,919,083 to Axelrod, Apr. 24, 1990;
U.S. Pat. No. 5,263,436 to Axelrod, Nov. 23, 1993;
U.S. Pat. No. 5,269,256 to Viola, Dec. 14, 1993;
U.S. Pat. No. 5,415,132 to Meyer, May 16, 1995;
U.S. Pat. No. 5,711,254 to O'Rourke, Jan. 27, 1998;
U.S. Pat. No. 5,904,118 to Markham, May 18, 1999;
and the following design patents:
U.S. Des. Pat. No. 319,605 to Jenks, Sep. 3, 1991;
U.S. Des. Pat. No. 327,962 to O'Rourke, Jul. 14, 1992;
U.S. Des. Pat. No. 329,310 to O'Rourke, Sep. 8, 1992;
U.S. Des. Pat. No. 330,614 to O'Rourke, Oct. 27, 1992;
U.S. Des. Pat. No. 330,921 to LaMagna, Nov. 10, 1992;
U.S. Des. Pat. No. 343,930 to Garcia, Feb. 1, 1994;
U.S. Des. Pat. No. 348,959 to Lawson, Jul. 19, 1994;
U.S. Des. Pat. No. 356,879 to O'Rourke, Mar. 28, 1995; and
U.S. Des. Pat. No. 368,932 to Mussalo, Apr. 16, 1996;

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an animal toy that a dog may carry in its mouth.

It is also an important object of the invention to provide an animal toy that is easy for a dog to pick up off of the ground.

Another object of the invention is to provide an animal toy that can float.

Still another object of the invention is to provide an animal toy that is visible in the dark.

Still yet another object of the invention is to provide an animal toy that glows in the dark.

Yet another important object of the invention is to provide an animal toy that can be used to teach a dog to fetch on land.

Still yet another important object of the invention is to provide an animal toy that can be used to teach a dog to fetch from the water.

It is a useful object of the invention is to provide an animal toy that is made of a material that a dog may chew.

It is a further useful object of the invention is to provide an animal toy that is made from wood.

It is a still further useful object of the invention is to provide an animal toy that is made from cellulose.

It is another useful object of the invention is to provide an animal toy that includes a cellulose and a binding agent or a resin.

It is a beneficial object of the invention is to provide an animal toy that includes a flavor added thereto.

It is a further beneficial object of the invention is to provide an animal toy that is chewable.

It is a still other beneficial object of the invention is to provide an animal toy that is formed of any desired color.

It is a useful and beneficial object of the invention is to provide an animal toy that resembles in appearance a branch segment.

It is another useful and beneficial object of the invention is to provide an animal toy that includes a textured surface that resembles a bark from a tree.

It is one further useful and beneficial object of the invention is to provide an animal toy that is rigid.

It is still one further useful and beneficial object of the invention is to provide an animal toy that is flexible.

It is still one further useful and beneficial object of the invention is to provide an animal toy that includes at least one break-off segment.

It is still one additional further useful and beneficial object of the invention is to provide an animal toy that includes a camouflage covering or texture surface.

Briefly, an animal toy that is constructed in accordance with the principles of the present invention has a straight or curved segment with at least one protrusion extending therefrom that resembles in appearance a branch. The animal toy is of any size and may be either flexible or rigid, floatable, chewable, edible, and the like depending upon the material that it is made from, including plastic, rubber, wood, and wood composites. A flavoring (or scent) may be added to the animal toy to encourage a dog to chew and possibly to consume the animal toy, depending upon what it is made from. Break-away notches are provided, as desired, to permit the animal toy to be broken into smaller segments. A glow in the dark material may be included with the animal toy to make it easier to use in the dark. Conversely, it may include a camouflage covering.

DETAILED DESCRIPTION OF THE INVENTION

Figure 1:
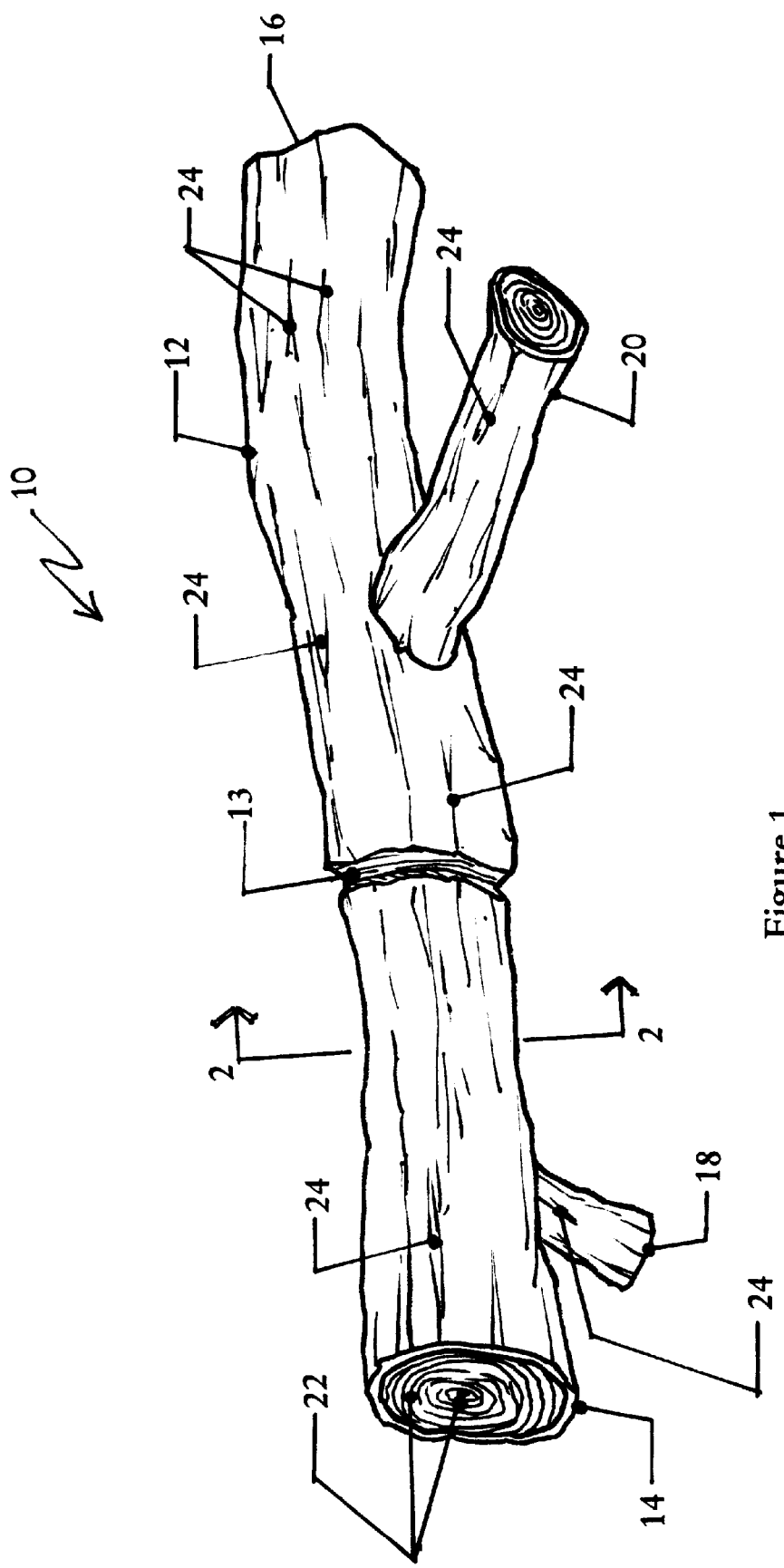
FIG. 1 is a view in perspective of an animal toy.

Referring to FIG. 1 is shown, an animal toy, identified in general by the reference numeral 10.

The animal toy 10 is formed of any of a variety of materials depending upon the characteristics that are desired, including plastic, rubber, wood, and wood composites to name a few.

The animal toy 10 includes a main section 12 with a notch 13 disposed around its perimeter intermediate a first end 14 and a second end 16.

The notch 13 creates a weak area along the main section 12 where, by applying a pressure, the animal toy 10 may be broken into two pieces. This is useful to extend its life or when it is to be used with smaller types of dogs.

Of course, if additional notches (not shown) are used, the animal toy 10 may be broken into more than two pieces.

Attached to and extending away from the main section 12 is a first protrusion 18 and a second protrusion 20. At least one, namely the first protrusion 18, is required for use with the animal toy 10 in order to realize its advantages. Accordingly, when the animal toy 10 is broken into two (or more) pieces, it is desirable that each piece include at least one of the first or second protrusions 18, 20.

The use of at least one of the first or second protrusions 18, 20 ensures that the animal toy 10 will provide an irregular and somewhat raised portion above a ground surface upon which the animal toy 10 is placed (or lands if it is thrown). The irregular and raised portions make it easier for a dog (not shown) to pick up and carry the animal toy in its mouth.

The first end 14 of the animal toy 10 includes a plurality of rings 22 that resemble those of a stick or branch. To further the illusion of being a stick or a branch, a simulated textured bark 24 is disposed along the longitudinal length of the animal toy 10.

Figure 2:
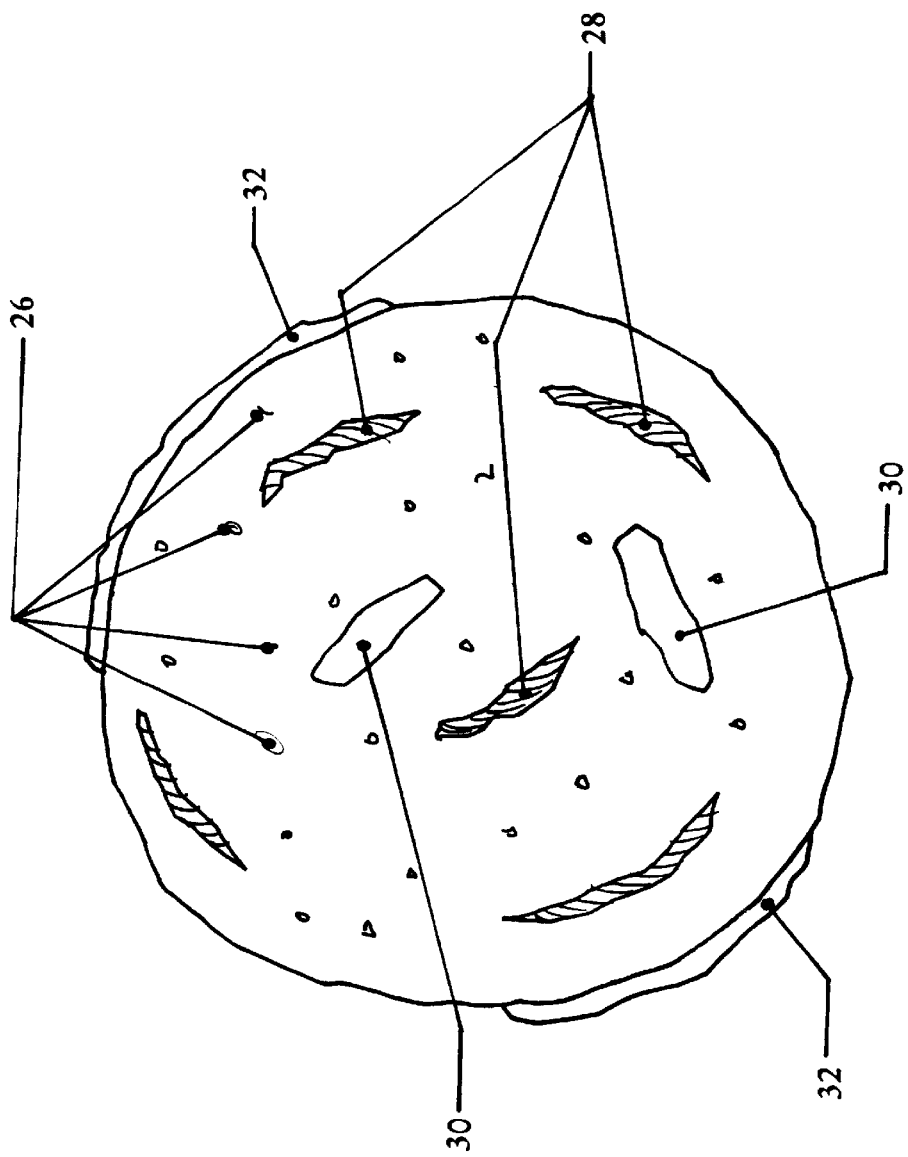
FIG. 2 is an enlarged cross sectional view taken on the line 2—2 in FIG. 1 of a possible modified embodiment.

Referring now also to FIG. 2, is shown a variety of possible modifications to the animal toy 10. The animal toy 10 is formed of a plurality of cellulose (wood) fibers 26 that are held together in the desired shape by pressing them tightly together, in a manner similar to that which particle board, a building material (not shown), is formed in which the natural resins act as a binding agent under pressure.

Any preferred type of a wood may be used. The fibers 26 are of any preferred size and include small particles to larger chips.

If it is desirable to encourage the dog to chew on the animal toy 10, a layering of a flavoring 28 is added throughout the animal toy 10, as desired.

The flavoring 28 provides both a flavor and a scent that encourages the dog to chew or play with the animal toy 10.

Depending upon the material used to form the animal toy 10 it may be desirable that the dog actually consume (eat) the animal toy 10. For example, it may contain various types of dietary fibers beneficial to the dogs digestive system. These fibers may also be added to the animal toy 10 as a separate ingredient when it is formed or they may be a natural by-product arising from the materials, such as wood, that are alternatively used to form the animal toy 10.

Some materials have a specific gravity that is less than that of water and so the animal toy 10 will naturally float. If that is not the case and it is desirable that the animal toy 10 should float, then a plurality of pockets 30 are provided when the animal toy 10 is formed. The pockets 30 contain any preferred material that includes a specific gravity that is less than that of water (i.e., that is lighter than water).

Accordingly, the animal toy 10 does not contain any voids.

A fluorescent coating 32 is applied where desired to the surface of the animal toy 10 (or mixed into the forming material) so that it may glow in the dark. This permits use of the animal toy 10 under low light conditions.

Of course, the animal toy 10 may be formed of any desired color. The simulated textured bark 24 may be of any depth or color or pattern, as desired.

Figure 3:
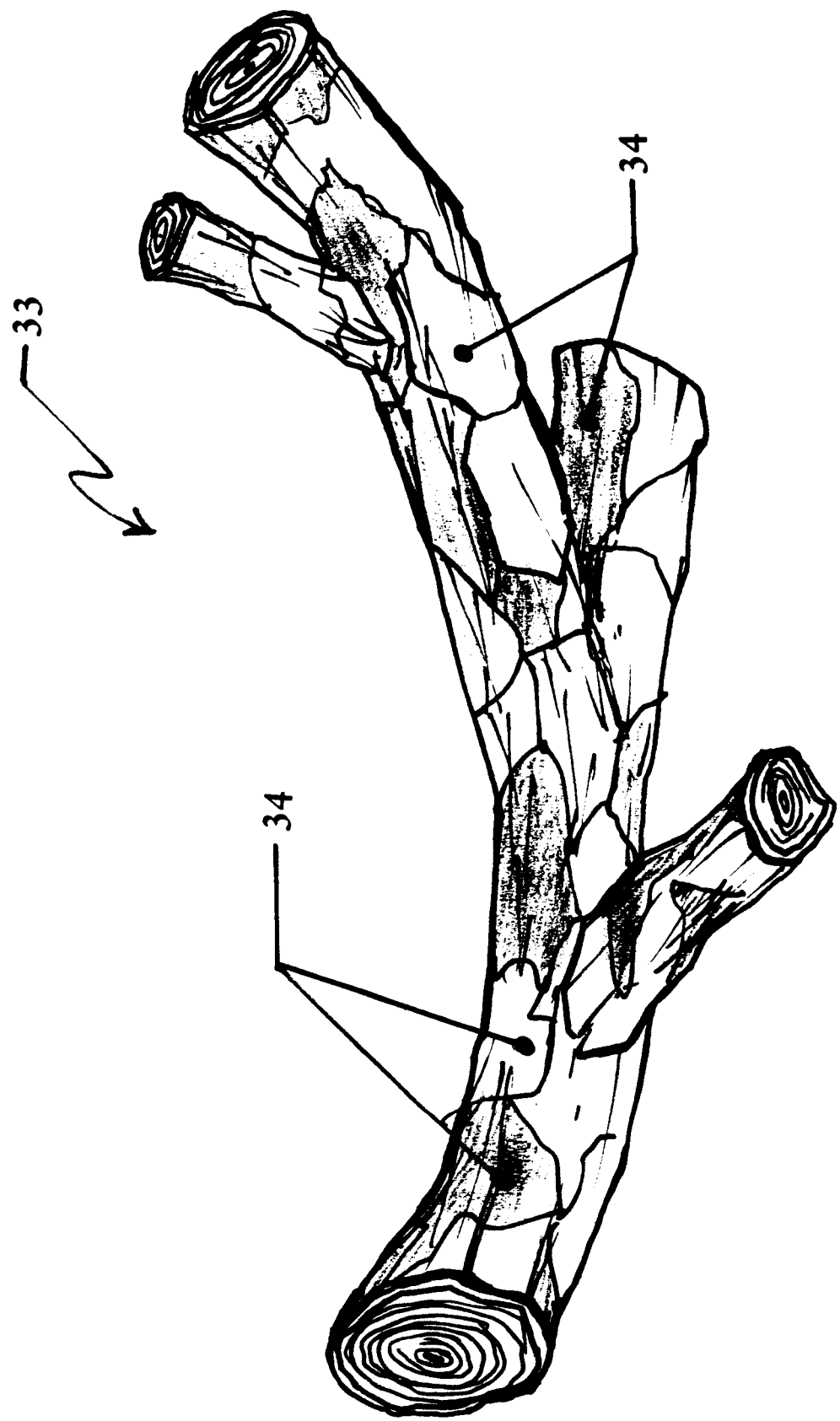
FIG. 3 is a view in perspective of an alternate camouflage embodiment of an animal toy illustrating a more curved shape.

However, a modified animal toy 33 is shown in FIG. 3 in which a camouflage pattern 34 is employed. The camouflage pattern 34 may be any color, but since it is generally believed that many animals and most dogs are colorblind, it is the pattern rather than the colors used that are believed to be most important.

The camouflage pattern 34 helps to prevent location of the animal toy 10 by visual means. This requires the dog to locate the animal toy 10 by scent alone (such as when it is thrown).

The modified animal toy 33 includes a modified main segment 36 that is substantially curved. The curvature facilitates throwing, retrieval, and carrying of the modified animal toy 33. It may also include the notch 13 (not shown in this drawing), as desired.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

For example, the animal toy 10 may be used with other types of animals, other than dogs, to provide for either a dietary, chewing, or amusement benefit. Accordingly, the ingredients used to form the animal toy 10 are modified to optimally comply with the needs of whatever type of an animal is to use it.

What is claimed is:

1. An animal toy, comprising:
   (a) a solid main section having a diameter and a longitudinal length and extending a predetermined distance along said longitudinal length; and
   (b) at least one protrusion attached at one end thereof said main section and extending a predetermined distance therefrom and wherein said at least one protrusion includes a second longitudinal axis that is not in parallel alignment with a first longitudinal axis of said solid main section;
   and wherein said animal toy is adapted to float on the water.

2. The animal toy of claim 1 wherein said main section is formed of a rubber.

3. The animal toy of claim 1 wherein said main section is formed of a plastic.

4. The animal toy of claim 1 wherein said main section includes a wood.

5. The animal toy of claim 1 wherein said main section includes cellulose.

6. The animal toy of claim 1 wherein said main section includes a flavoring.

7. The animal toy of claim 1 wherein said main section includes a scent added thereto.

8. The animal toy of claim 1 wherein said main section is rigid.

9. The animal toy of claim 1 wherein said main section is flexible.

10. The animal toy of claim 1 wherein said main section is chewable.

11. The animal toy of claim 1 wherein said main section includes a material that is lighter than water.

12. The animal toy of claim 1 wherein said animal toy includes a fluorescent coating.

13. The animal toy of claim 1 wherein said animal toy includes a camouflage coating.

14. The animal toy of claim 1 wherein said animal toy is formed of wood particles.

15. The animal toy of claim 1 wherein said animal toy is formed of wood chips.

16. The animal toy of claim 1 wherein said main section includes at least one notch, said at least one notch adapted to fracture said animal toy proximate said notch upon an application of sufficient lateral pressure to said animal toy.

17. A method for making an animal toy, which comprises:
compressing particles of cellulose together under pressure sufficient to retain said particles together when said pressure is removed so as to form said animal toy wherein said animal toy includes a main section having a first longitudinal axis and at least one protrusion extending therefrom and wherein said at least one protrusion includes a second longitudinal axis that is not parallel with respect to said first longitudinal axis and wherein said animal toy is adapted to float on the water.

18. The method of claim 17 including the step of adding a flavoring to said particles of cellulose prior to the step of compressing.

19. The method of claim 17 including the step of adding a resin to said particles of cellulose prior to the step of compressing.

20. The method of claim 17 wherein said particles are compressed so as to produce a main section having a diameter and a length and at least one protrusion attached thereto.

* * * * *

(12) EX PARTE REEXAMINATION CERTIFICATE (5445th)
United States Patent
Long, III

(10) Number: US 6,360,693 C1
(45) Certificate Issued: Jul. 4, 2006

(54) ANIMAL TOY

(75) Inventor: Ross Eugene Long, III, 4732 Reinhardt Dr., Oakland, CA (US) 94619

(73) Assignee: Ross Eugene Long, III, Oakland, CA (US)

Reexamination Request:
No. 90/006,301, Jun. 6, 2002

Reexamination Certificate for:
Patent No.: 6,360,693
Issued: Mar. 26, 2002
Appl. No.: 09/454,229
Filed: Dec. 2, 1999

(51) Int. Cl.
*A01K 29/00* (2006.01)

(52) U.S. Cl. .................................................. 119/707
(58) Field of Classification Search ............... 43/42.26; 446/153; 428/18; 132/329; 135/86; 119/256, 119/268, 467, 468, 702, 707, 709, 710, 711; 47/47; D30/160; 441/88; 463/47.6; 482/83
See application file for complete search history.

(56) References Cited

U.S. PATENT DOCUMENTS

| | | | | |
|---|---|---|---|---|
| 869,493 A | * | 10/1907 | Keiser | 47/6 |
| 1,050,535 A | * | 1/1913 | Hartung | 44/572 |
| 3,441,959 A | * | 4/1969 | Sears et al. | 428/304.4 |
| 3,660,055 A | * | 5/1972 | Haller | 44/535 |
| 4,318,247 A | * | 3/1982 | Lewis | 47/43 |
| 4,557,219 A | * | 12/1985 | Edwards | |
| 4,699,829 A | * | 10/1987 | Willinger | 428/17 |
| 4,937,971 A | * | 7/1990 | Collas et al. | 47/6 |
| 5,018,480 A | * | 5/1991 | Goldman et al. | 119/468 |
| 5,213,855 A | * | 5/1993 | Buxton | 428/17 |
| 5,630,998 A | * | 5/1997 | Parsons | 434/11 |
| 5,958,090 A | * | 9/1999 | Chandaria | 44/535 |
| 5,962,088 A | * | 10/1999 | Tanaka et al. | 428/18 |
| 6,033,608 A | * | 3/2000 | Reynolds et al. | 264/54 |
| D428,220 S | * | 7/2000 | Veits et al. | |
| 6,209,258 B1 | * | 4/2001 | Schneider | 47/46 |

\* cited by examiner

*Primary Examiner*—Robert P. Swiatek

(57) ABSTRACT

An apparatus for use as a toy by an animal, for example a dog, to either fetch carry or chew includes a main section with at least one protrusion extending therefrom that resembles a branch in appearance. The toy is formed of any of a number of materials including rubber, plastic, or wood including wood composites and is solid. It is either rigid or flexible. A flavoring (scent) is added, if desired. The toy is adapted to float by including a material therein that is lighter than water or it is adapted to glow in the dark, as desired, by the addition of a fluorescent material that is either included in the material from which the toy is made or the flourescent material is applied thereto as a coating. The toy may be segmented (i.e., notched) so as to break off into smaller segments, as is useful for smaller animals or, alternatively, to extend the life of the toy. Various textured surfaces including camouflage colorings are anticipated as are straight or curved main sections. The toy may be formed of any desired material, as described, so as to be edible by the animal.

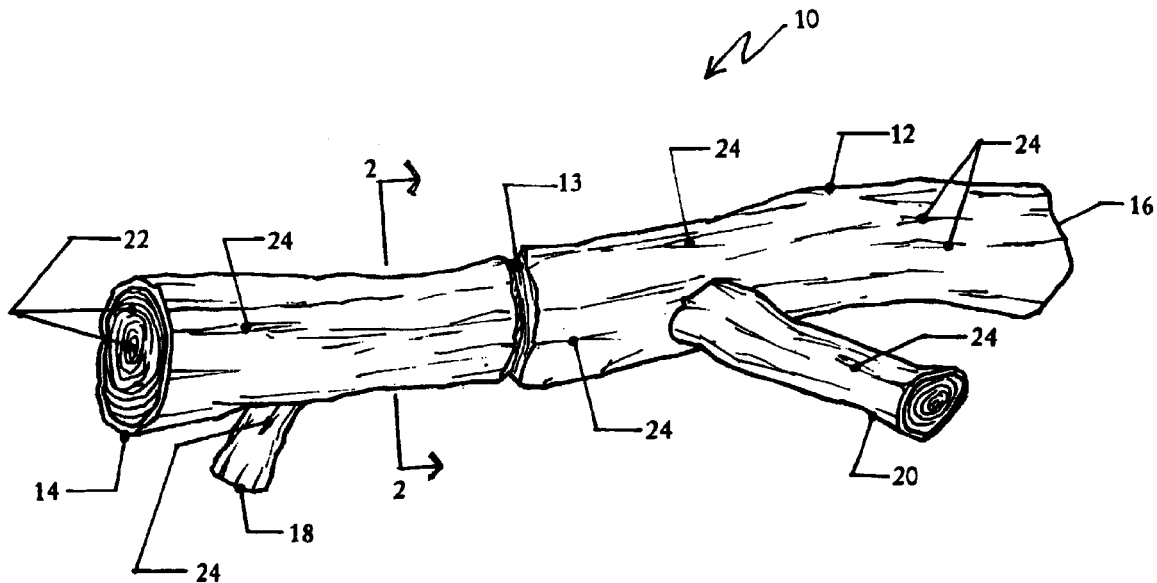

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–20 are cancelled.

\* \* \* \* \*